United States Patent [19]

Murphy et al.

[11] Patent Number: 4,643,446

[45] Date of Patent: Feb. 17, 1987

[54] MOBILE CHAIR WITH REMOVABLE REAR WHEEL ASSEMBLY

[75] Inventors: Kenneth J. Murphy; Gerald R. Baker; Matthew F. Gard, all of Elyria, Ohio

[73] Assignee: The STC Companies, Inc., Elyria, Ohio

[21] Appl. No.: 659,709

[22] Filed: Oct. 11, 1984

[51] Int. Cl.4 .................................................. B62B 3/02

[52] U.S. Cl. ...................................... 280/648; 180/11; 180/208; 180/907; 280/242 WC; 280/289 WC; 280/657; 297/DIG. 4

[58] Field of Search ......... 280/30, 242 WC, 289 WC, 280/648, 650, 642, 657; 414/921; 296/20; 297/DIG. 4, 328, 440; 5/81 R, 81 B, 86; 180/11, 15, 208, 907

[56] References Cited

U.S. PATENT DOCUMENTS

| | | | |
|---|---|---|---|
| Re. 30,867 | 2/1982 | Gaffney | 280/642 |
| 3,052,480 | 9/1962 | Sanstrom | 280/43.21 |
| 3,147,039 | 9/1964 | Smith et al. | 5/81 R |
| 3,198,575 | 8/1965 | Hawkins | 297/328 |
| 3,761,126 | 9/1973 | Mulholland | 297/411 |
| 4,274,651 | 6/1981 | Dumont | 280/242 WC |
| 4,323,133 | 4/1982 | Williams | 280/242 WC |
| 4,358,125 | 11/1982 | Charles | 297/440 |
| 4,362,311 | 12/1982 | Bergman | 280/242 WC |

FOREIGN PATENT DOCUMENTS

| | | | |
|---|---|---|---|
| 2845870 | 5/1980 | Fed. Rep. of Germany | 297/DIG. 4 |
| 472213 | 6/1969 | Switzerland | 414/921 |
| 2029334 | 3/1980 | United Kingdom | 297/DIG. 4 |

*Primary Examiner*—John J. Love
*Assistant Examiner*—Eric D. Culbreth
*Attorney, Agent, or Firm*—Renner, Otto, Boisselle & Lyon

[57] ABSTRACT

A mobile chair for the handicapped includes a seat frame, a front support frame and a removable rear support frame. The seal frame is pivotable with respect to the front support frame selectively to vary the position of the seat frame. The rear support frame is releasable from the front support frame and is connected thereto by a toggle mechanism at the rear and a pivotal releasable ball and socket joint at the front. To place the chair in a car or other vehicle, the front of the chair is first placed on the vehicle floor, the rear toggle connection is released and the seat frame and front support frame are placed on the vehicle seat. The ball and socket joint permits the seat frame and front support frame to be pivoted into the car and placed on the seat while the rear support frame remains essentially stationary outside the vehicle. Once the chair is in the vehicle, the ball and socket connection is released and the rear support frame may be removed and stowed elsewhere.

25 Claims, 12 Drawing Figures

FIG. 4
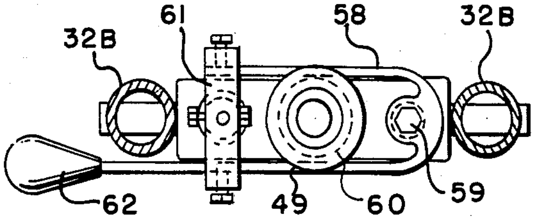
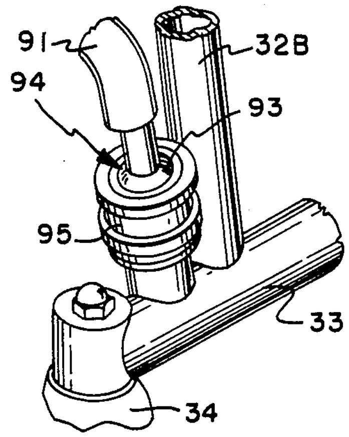
FIG. 5
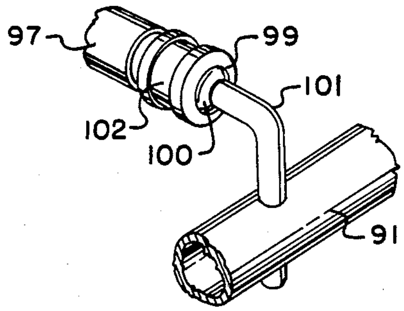
FIG. 6
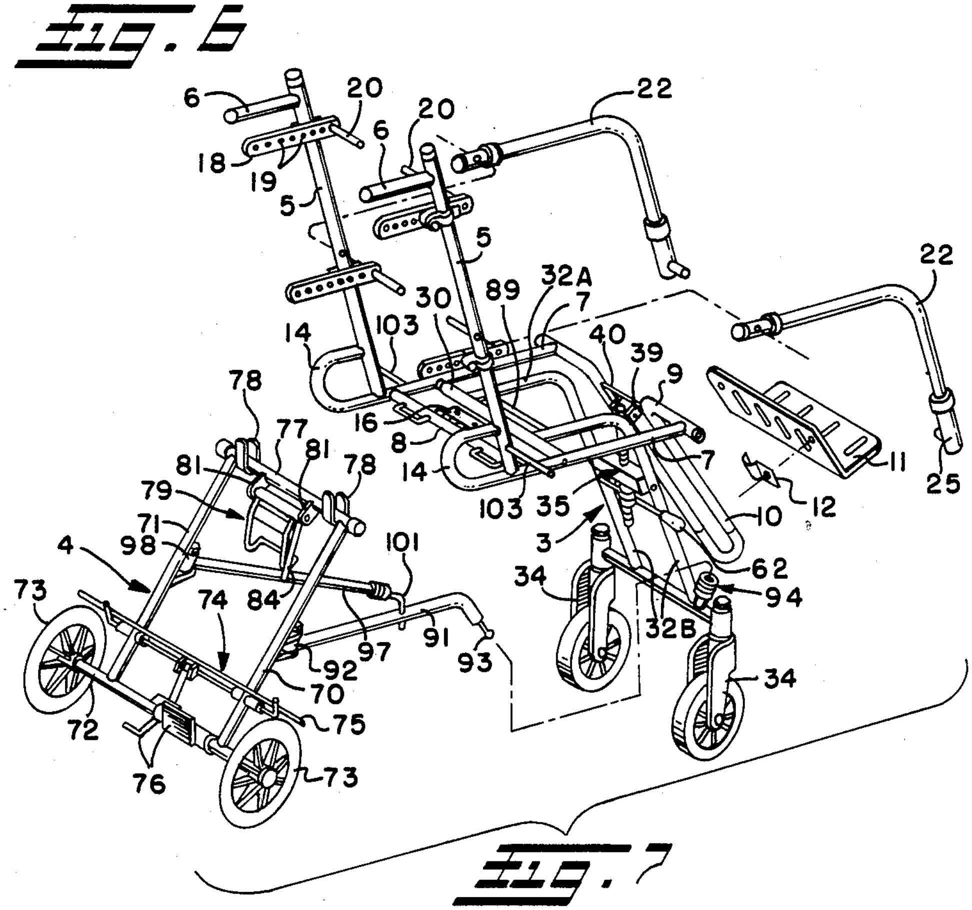
FIG. 7

MOBILE CHAIR WITH REMOVABLE REAR WHEEL ASSEMBLY

FIELD OF THE INVENTION

The present invention relates to a mobile chair for the handicapped which may be used either inside an automobile as a car seat or outside an automobile as a wheelchair.

BACKGROUND OF THE INVENTION

Many handicapped people, especially those suffering from cerebral palsy, require special adaptive chairs. For those who are severley involved, an adaptive chair may provide one of the only means for sitting upright. Adaptive chairs may have various supports attached to them which serve to hold the person in an upright sitting position.

These adaptive chairs may be mobile, and several mobile chairs have been adapted for use as a stroller and as a car seat. An example of such a chair is shown in Gaffney U.S. Pat. No. Re. 30,867. The Gaffney patented chair has front casters which are relatively close together. These casters are supported by a narrow leg of the chair frame extending downwardly and forwardly from the front of the chair seat. The rear wheels are spaced father apart for stability, and they are mounted to the chair frame by a telescoping tube mechanism so that they can be retracted upwardly out of the way to permit the chair seat to rest on the seat of a car. Further, the telescoping tube mechanism can be expanded and retracted to effect a change of the seating angle for use outside the car from a generally upright position to one in which the seat back is reclined.

The Gaffney patented chair has certain disadvantages. The front casters do not track properly at all seating angles. The chair may be difficult for a small attendant to put into a car because one leg must be used to retract the rear wheels while the chair is held above the ground and because the entire weight of the chair and patient must be lifted. Once in a car, the retracted rear wheels may be pressed against the car seat and may damage or stain it. Additionally, the needs of a handicapped patient may change over time. For example, a patient will grow requiring different dimensional parameters for the chair and may become strong enough to self propel a chair with handgrips on the rear wheels. A child or small patient may also develop enough coordination to operate a joystick type controller for a motor driven chair. The Gaffney patented chair cannot be adapted to meet these changing needs.

Another form of adaptive chair serving both a stroller and car seat function is shown, for example, in Mulholland U.S. Pat. No. 3,761,126 and in the Mulholland Company literature. The Mulholland mobile chair includes a chair frame mounted in adjustable, cantilevered fashion to a base. The Mulholland chair frame includes a front leg that can be placed on the floor of a car when the chair frame is tilted and the base extends under the car. The chair frame is then released from the base and pivoted into the car, and the base may be stored in the trunk. The Mulholland chair is bulky and rather difficult to use and is not readily adaptable to either a motorizedbase or a large wheel base.

SUMMARY OF THE INVENTION

A mobile chair constructed according to the present invention provides for facile placement of the chair and its occupant into or out of an automobile or other vehicle. Additionally, a chair constructed in accordance with the present invention is readily adapted to the changing needs of a handicapped person and provides advantageous service functions.

A mobile chair constructed according to the present invention has a seat frame to support a seat bottom and a seat back as well as the various adaptive equipment which may be required. The seat frame, which provides 90° angles at the waist and knee areas, is pivoted to a front support frame and may be tilted to vary the inclination of the seat frame with respect to the ground. The front support frame carries front groundengaging casters, and the rear support frame carries ground-engaging wheels. The rear support frame is releasable from the front support frame and seat frame to facilitate putting the seat frame and front support frame in an automobile and to adapting the chair to differing needs.

A chair constructed according to the present invention may be placed in an automobile, truck, or other vehicle. The chair is rocked back on its rear wheels and pushed forward until the front casters rest on the vehicle's floor. Then the rear support frame is partially released from the front support frame at the juncture between the seat bottom and seat back. This release permits the front support frame, seat frame and patient to be lifted and pivoted onto the car seat without having to lift the rear support frame and rear wheels. Thereafter, the rear support frame is fully released by uncoupling a pivotal joint between the front of the rear support frame and the front support frame. The rear support frame may then be conveniently removed, collapsed and stowed. During the entire loading operation, the attendant has both feet on the ground and has a reduced lifting load because the rear support frame is not lifted.

Because the rear support frame is releasable, several styles of support frames may be used with the same seat frame and front support frame. For example, one style rear support frame may have 8-inch wheels on 16-inch centers, another style may have 8-inch wheels on 23-inch centers, still another may have 24-inch wheels with hand rims, and yet another may be provided with a battery pack and motor driven wheels. Moreover, regardless of which rear support frame is used, it is not put into the vehicle with the rest of the mobile chair. Therefore, the seat of the vehicle is not damaged in any way by retracted rear wheels, and the weight to be lifted is correspondingly reduced. Additionally, the rear support frames may be readily collapsed for convenient storage in an automobile trunk or back seat.

There are other features which add to the utility of the mobile chair constructed in accordance with the present invention. The mechanism which enables the chair frame to tilt is entirely independent of the rear wheels and casters. Thus the seat can be tilted to various inclinations from a standard seat height, and the casters always track properly regardless of the seat inclination. Additionally, the seat position may be changed using either of two releases, one conveniently located for an attendant standing bheind or pushing the chair. The other release is convenient to an attendant, such as a physical therapist, sitting beside the chair.

The seat frame is provided with loops made of the same metal tubing as the seat frame, such loops extending rearwardly from the base of the seat frame. These loops are used as handles to assist the attendant in lifting the seat frame and also as means to secure the chair in a vheicle with the vheicle's seat belt. The loops space the chair away from the car seat back to protect the car seat.

The seat frame and rear support frame may readily be increased in width by using easily installed expansion inserts. This width expansion permits the physical therapist to continually inexpensively adapt the mobile chair to the needs of a growing patient.

The invention, then, comprises the features hereinafter fully described and particularly pointed out in the claims, the following description and annexed drawings setting forth in detail certain illustrative embodiments of the invention, these being indicative, however, of but a few of the various ways in which the principles of the invention may be embodied.

BRIEF DESCRIPTION OF THE DRAWINGS

In the drawings:

FIG. 4 illustrates a bottom plan view taken along the plane 4—4 in FIG. 3 showing the releasable latch mechanism;

FIG. 5 illustrates a pivotable and releasable ball and socket connection between the rear support frame and front support frame forming a part of the mobile chair of FIG. 1;

FIG. 6 illustrates a releasable connection for a reinforcement brace forming a part of the removable rear support frame of FIG. 2;

FIG. 7 is an exploded rear perspective of the main structural members of the mobile chair of FIG. 1, with the rear support frame being separated from the front support frame;

DESCRIPTION OF THE PREFERRED EMBODIMENTS

Figure 1:
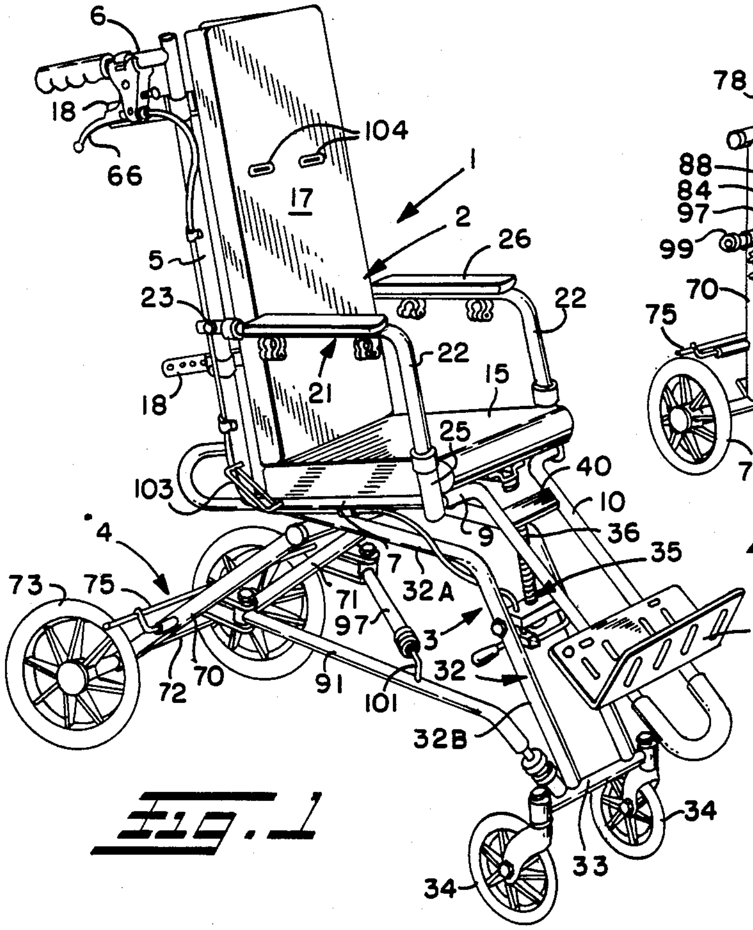
FIG. 1 is a perspective view of a mobile chair constructed in accordance with the present invention.

FIG. 1 illustrates a mobile chair 1 constructed in accordance with the present invention. The mobile chair 1 includes a seat frame 2, a front support frame 3, and a removable rear support frame 4. The mobile chair 1 is for a handicapped person and may be provided with necessary and conventional adaptive accessories (not shown) to support the individual in the chair. The primary users of the chair 1 are children, often those stricken with cerebral palsy. The accessories these children require are known in the trade and are fit to the individual according to that person's needs. The accessories from which the physical therapist can chose, for use along or in combination as required, include head and neck supports, torso pads, seat belts, hip pads, shoulder harnesses, abductors, aductors, trays and various style foot rests, among others. The principal components of the mobile chair of the present invention as identified above will be discussed in sequence below, followed by a description of the method for using the mobile chair.

Seat Frame 2

As best shown in FIG. 7, the seat frame 2 includes a rigid tubular framework. This rigid framework includes two parallel, generally vertical seat back support tubes 5 respectively having rearwardly extending handles 6 adjacent their upper ends. The seat back support tubes 5 are respectively welded at their lower ends to generally parallel seat bottom support tubes 7. The seat bottom support tubes 7 are rigidly interconnected adjacent their back ends by a stretcher tube 8. The seat bottom support tubes 7 are rigidly interconnected at their forward ends by being respectively welded to opposite ends of a footrest support assembly 9 extending therebetween. The footrest support assembly 9 includes a downwardly and forwardly extending U-shape tubular section 10. An angle shape footrest 11 can be secured to the footrest support assembly 9 by brackets 12. The footrest 11 may be secured at any position of elevation along the U-shape tubular section 10 in accordance with the needs of the patient.

To assist in manipulating and positioning the seat frame 2, the seat bottom support tubes 7 extend rearwardly from the seat back support tubes 5, are bent 180°, and are welded to the upright support tubes 5. This bent tubular portion forms loops 14 for those uses set forth in more detail below in the description of the method for using the chair.

The chair 1 includes a seat bottom 15 mounted on and supported by seat bottom support tubes 7 and by an adjustable bracket 16 connected to stretcher tube 8. The seat also includes a seat back 17 which is adjustably mounted to the upright support tubes 5.

In this regard, the adjustable mounting is provided, as shown, by at least two vertically spaced pairs of adjustable brackets 18 clamped to the seat back support tubes 5 at selected locations therealong depending upon the type of seat back 17 being used. These brackets 18 each have a plurality of spaced holes 19 therethrough which may be individually used as required to secure the brackets to the clamp at a preselected location relative to the upright tubes 5 depending upon the position of the seat back required for the patient. The forward ends of each of the brackets 18 have inwardly extending rods 20 which are received in and secured to mounting brackets (not shown) on the back side of seat back 17.

The seat is completed by two arms indicated generally at 21 on opposite sides of the seat. These arms 21 include L-shape tubes 22 having the rear end of the horizontal part thereof pivotally connected at 23 to upright back support tubes 5. The forward and bottom ends of the L-shape tubes 22 are respectively telescopically received in larger diameter tubular mounts 25 connected to the seat frame. The L-shape arm tubes 22 may be selectively moved in and locked to tubular mounts 25 to vary the angle of the arms 21 relative to the seat. The arms 21 may have arm rest pads 26 thereon for the comfort and support of the patient. The patient occupying chair 1 can be selectively moved between various use positions by pivoting the seat frame 2 relative to the front support frame 3.

Front Support Frame 3

The front support frame includes a cross tube 30 which extends between but is not connected to the two seat bottom support tubes 7. Cross tube 30 is in front of and generally parallel to stretcher tube 8 on seat frame 2. The cross tube 30 has an inner tube 31 received therein and extending therethrough. The inner tube 31 is connected at its opposite ends to the seat bottom support tubes 7 on the seat frame 2. This tube within a tube provides a pivotal connection between seat frame 2 and cross tube 30 of the front support frame 3.

Front support frame 3 further includes two generally parallel front leg tubes, indicated generally at 32, which are welded at their upper ends to cross tube 30. The front leg tubes 32 include horizontally extending upper ends 32A, and forwardly and downwardly extending lower ends 32B. The bottom ends of front leg tubes 32B are welded to and innerconnected by a caster mount tube 33. Caster assemblies 34 are removably mounted to the outboard ends of caster mount tube 33. The casters are preferably 5 inches in diameter although other size casters or wheels can be used, if desired.

The seat frame 2 can be positively held in the selected angular position relative to the front support frame 3 by a latching assembly, indicated generally at 35. This latching assembly 35 includes a rod 36 having spaced grooves 37 therein. The upper end of grooved rod 36 is pivotally mounted by pivot pin 38 to a yoke 39. The yoke 39 is connected to and extends rearwardly from a cross plate 40 rigidly welded to the U-shape tubular section 10 of footrest support assembly 9. The grooved bar 36 pivotally carried by seat frame 2 cooperates with a guide member 42 pivotally carried by front support frame 3.

This guide member 42 extends between the parallel front legs 32B of the front support frame and is pivotally mounted thereon as indicated at 43. The pivotal guide member 42 includes a central bore therein through which grooved bar 36 extends. The grooved bar 36 is selectively latched to guide member 42 and thus the front support frame 3 by a latch 44, which is mounted on and carried by the pivotal guide member 42.

This latch includes an inner bushing 45 secured to and extending downwardly from pivotal guide 42. The bushing 45 has a flange 46 at its upper end and a groove 47 at its lower end. The groove 47 receives a snap ring 48 which provides a bottom stop for a generally cylindrical collar 49 surround bushing 45. The cylindrical collar 49 may be selectively vertically moved relative to bushing 45. The collar 49 includes on its inner diameter an inwardly extending cam 50 cooperating with an annular array of ball bearings 51. The position of the collar 49 relative to bushing 45 dictates whether the grooved rod 36 is locked to the latch 44 or released from the latch 44.

In this regard, the collar 49 is biased downwardly by a spring 53 extending between the flange 46 on bushing 45 and the upper end of cam 50 on collar 49. Therefore, the collar 49 is normally urged downwardly against snap ring 47. In this collar position, the cam 50 positively holds the ball bearings 51 in the groove 37 of rod 36 aligned therewith, thereby to lock the rod to the pivotal guide 42. When the collar 49 is moved upwardly against the bias of spring 53, the ball bearings 51 move radially outwardly into annular chamber 54 in collar 49, thereby to unlock rod 36 and to permit rod 36 and thus the chair frame 2 to move relative to the latch 44 and front seat frame 3. Because of the pivotal mounting of the grooved rod 36 and guide plate 42, the grooved rod 36 moves through the guide plate as the seat frame changes position, with the alignment between the rod and plate being maintained by their respective pivotal mounts which compensate for the pivotal movement of the seat frame relative to the chair frame.

When the desired seat frame position is obtained, the collar 49 is released and moves downwardly under the bias of spring 53. The sloped surface 55 on cam 50 urges the ball bearings radially inwardly as the collar 49 moves downwardly positively to force the ball bearings into an aligned groove 37 on bar 36. The rod 36 is then locked to the latch to hold the rod and seat support frame in the selected position of inclination.

The latching mechanism can be unlocked in one of two ways by a release assembly indicated generally at 57. The release assembly 57 includes a U-shape bail 58 pivotally mounted at its closed end to the guide member 42 as indicated at 59. The two legs of the bail 58 are received in an external annular groove 60 on collar 49. A cross-piece 61 extends between and is mounted to the legs of bail 58. One of the legs of the bail 58 extends through the cross-piece 61 and forms a handle 62, which can be raised to elevate collar 49 and thus release the grooved bar 36 from latch assembly 44. A flexible cable 64 is also secured at one end to the cross-piece 61 and extends upwardly through a protective cover 65. The upper end of cable 64 is secured to a hand lever 66 mounted on one of the handles 6. When the hand lever 66 is moved upwardly by the attendant, the cable, cross-piece, bail and collar move upwardly to release the grooved bar 36 from the latching mechanism 44. Thus, the locking assembly 35 can be released either by actuating handle 62 or hand lever 66, but the locking assembly is normally held in a locked condition.

To this end, a spring 68 extends between pivotal guide member 42 and cross-piece 61 to urge the cross-piece 61 and bail 58 downwardly. Thus spring 68 cooperates with the spring 51 in latch 44 positively to retain the latch in locked condition to fix the seat frame 2 relative to the front support frame 3. An additional locking mechanism can be employed if desired to avoid inadvertent actuation of either hand grip 66 or handle 62. Thus the seat frame is positively locked to the front support frame when the rear support frame 4 is connected to or removed from the mobile chair 1.

Removable Rear Support Frame 4

The rear support frame 4 includes two generally parallel upright support tubes 70 and 71 interconnected at their bottoms by tube 72. Tube 72 is provided with bearings rotatably to receive an axle extending therethrough. Rear wheels 73 are releasably mounted to the opposite ends of the axle. As shown, 8-inch wheels are mounted on 16-inch centers although a wider axle and/or larger wheels may be readily used. Rear wheels 73 are selectively locked by a conventional breaking system 74 mounted on the upright tubes 70 and 71. This breaking system includes a locking rod 75 which may be moved into or removed from contact with the rear wheels by a conventional foot operated camming system 76.

The upper ends of support tubes 70 and 71 are interconnected by upper cross tube 77. This upper tube has a pair of spaced U-shaped guide members 78 mounted thereon, with such guide members opening upwardly. The upper support tube 77 of rear support frame 4 also includes a toggle clamp 79 adapted to be one of the two releasable connections between the rear support frame and front support frame.

Figure 10:
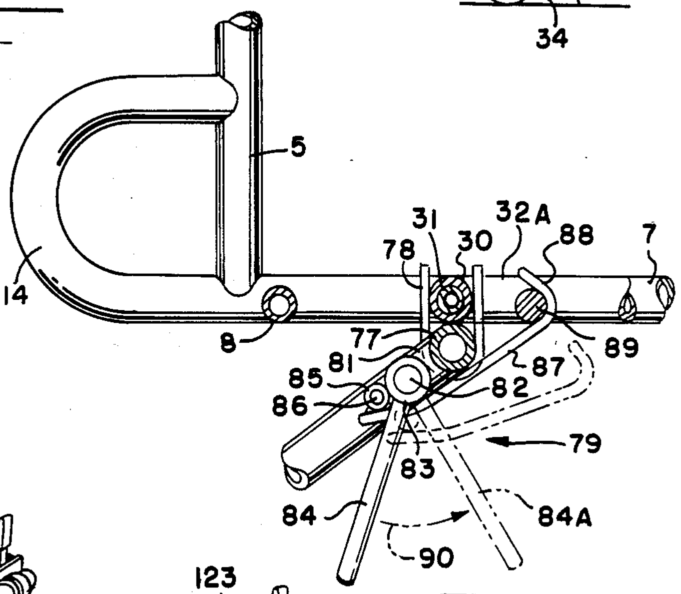
FIG. 10 is a cross section of a toggle release clamp used to connect the upper end of the rear support frame to the front support frame at approximately the intersection of the seat back and seat bottom.

As best shown in FIG. 10, the toggle clamp 79 includes a pair of tabs 81 welded to the upper cross tube 77 and extending downwardly therefrom. A shaft 82 extends between the two tabs 81, and a collar 83 is rotatably mounted on shaft 82. The collar 83 has a handle 84 fixed thereon and extending outwardly therefrom. The collar 83 also has two trunnions 85 welded to one side thereof, with the trunnions 85 receiving a pivotal shaft 86 on the proximal end of latch 87. The distal end of latch 87 has a hooked portion 88 that is selectively received around a locking rod 89 extending between and connected to portions 32A of front legs 32.

When the toggle mechanism 79 is unlatched, handle 84 and latch 87 hang generally downwardly as shown in FIG. 7. To latch toggle mechanism 79 after cross tube 30 on front support frame 3 has been received in the U-shape guide members 78, the handle 84 and collar 83 are swung in a counterclockwise direction as indicated by arrow 90 in FIG. 10 to assume the handle position shown at 84A. The latch 87 then has sufficient clearance to be positioned loosely around clamping rod 89 on front support frame 3. The handle 84 and collar 83 may then be swung in a clockwise direction until the eccentric trunnions 85 for the pivotal connection of the latch assume an overcenter position as shown in solid lines in FIG. 10. This provides a tight, positively retained, clamp for toggle mechanism 79 securing the front support frame to the rear support frame. These two frames are also interconnected by a second releasable connection therebetween.

In this regard, the rear support frame includes a strut 91 pivotally connected at 92 to upright tube 70. The forward end of strut 91 is bent downwardly and forwardly with its distal end being provided with a ball 93. This ball 93 is selectively received in a socket 94 extending angularly upwardly from caster support tube 33 on front support frame 3. This socket 94 receives and holds the ball 93 on strut 91 and selectively permits the front support frame to swivel or pivot relative to the rear support frame. The socket 93 is provided with a spring loaded collar 95 which may be depressed to release the retention means holding the ball 93 in socket 94.

The rear support frame further includes a reinforcement brace 97 pivotally connected at 98 to upright tube 71. The forward end of straight reinforcement brace 97 includes a socket 99 which selectively receives and holds a ball 100 mounted on a bent rod 101 connected to strut 91. The socket 99 also has a sleeve 102 which can be moved relative to the socket to cam the retention means radially outwardly to release the ball 100 from the socket to uncouple the reinforcement brace from the strut. This reinforcement brace 97 when connected extends diagonally between upright tube 71 and strut 91 to rigidity the rear support frame 4 and thus the mobile chair 1 during use.

Operation and Use of Mobile Chair 1

In the assembled condition of the mobile chair, the rear support frame is rigidly connected to the front support frame. This rigid connection is provided at the back by the toggle clamp 79 and is provided at the front by the ball and socket connection of strut 91 to the front support frame 3. The patient is placed in the seat of the seat support frame 2 and can be moved from place to place since the front casters and rear wheels make the chair mobile. The patient can be secured in the chair during use by a seat belt on the chair, by a harness system on the chair and/or by other conventional pads and accessories. To this end, the seat frame 2 is provided with seat belt anchors 103 on both sides of the seat, and the seat back cushion 17 is provided with grommets 104 to accept a harness system carried by the chair. When the patient is fit to and secured in the chair 1, the patient can be placed in different positions of inclination by pivoting seat frame 2 relative to front support frame 3.

This pivotal movement of the seat frame can be initiated by a standing attendant through use of hand level 66 or by a sitting attendant through use of handle 62. This handle 62 will always permit the seat frame 2 to be pivotally moved even if mechanical difficulties are experienced in hand lever 66 or its associated cable. The hand lever or handle when activated release the latch between the seat frame and front support frame to permit the attendant to select the desired position of the seat for the patient's activity at that given time.

In this regard, the bar 36 of the locking mechanism 35 has eight different spaced grooves 37 therein which may be selectively locked to latch 44. When the upper most groove 37 of bar 36 is retained by latch 44, the seat is positioned so that the seat bottom 15 is parallel to the floor and the seat back 17 is perpendicular to the floor. When the bottom groove 37 on bar 36 is held by the latch 44, the seat is reclined as far as possible, with the seat bottom and seat back remaining perpendicular to one another and at approximately 45° angles to the floor. The various grooves between the two extreme grooves provide a plurality of intermediate seating positions which may be selected according to the patient's needs at any given time. Since the seat frame is pivotally mounted to the front support frame, the front and rear support frames remain in the same positions during the pivotal movement of the seat frame. This structural relationship permits the seat to be tilted to various inclinations from a standard seat height. Moreover, the front caster assemblies 34 on the mobile chair 1 remain in their desired vertical orientation for proper tracking for all positions of the chair seat because the pivotal movement of the seat frame is independent of the front support frame and front casters.

Figure 8:
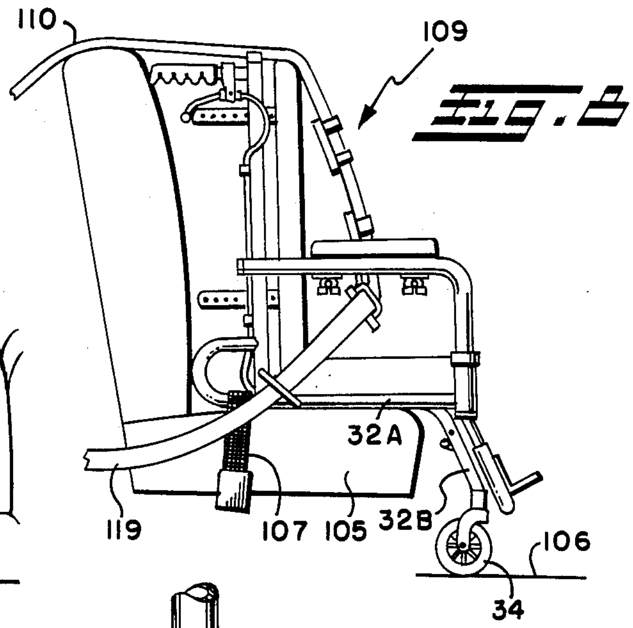
FIG. 8 illustrates the mobile chair of FIG. 1 in an automobile, with the rear support frame removed.

To position the handicapped patient in chair 1 into an automobile or other vehicle, the seat frame 2 is preferably brought to its upright position in which the seat bottom 15 is generally parallel to the ground and the tubes 7 and 32A lie in substantially the same plane. The chair 1 may tehn be rolled to the automobile and rocked back on its rear wheels to allow the front casters to be placed on the front floor of the automobile. The brake system 74 is then actuated to lock the rear wheels 73 in place. The toggle clamp 79 is then disconnected by pivoting level 84 forwardly to release the latch 87 to swing away from clamping tube 89 on the front frame. The front support frame 3 and seat frame 2 may now be elevated relative to the rear support frame and swung into the automobile, with such swinging movement being permitted by the pivotal ball and socket connection between strut 91 and the front support frame. The front support frame and seat frame are then placed upon the automobile seat 105 as shown in FIG. 8. The patient in the chair thus receives firm support from tubes 7 and 32A resting upon the car seat 105 and from caster assemblies 34 resting on the automobile floor 106.

The attendant in lifting and swinging the seat frame and front support frame into the automobile is lifting a reduced load with both feet on the ground since the rear wheel frame is released and does not have to be retracted or lifted. The attendant uses the handles 6 and/or loops 14 to accomplish the lifting function. The loops 14 also may engage the automobile seat back as shown in FIG. 8 to space the brackets and chair back from the automobile seat to reduce potential damage to the automobile seat. By removing the rear support frame and rear wheels, the automobile seat is also not exposed to dirt or other residue on the rear wheels.

After positioning the front support frame and seat frame in the automobile, the attendant releases the rear support frame, which still has its rear wheels 73 resting on the ground outside the automobile. This release is accomplished by actuating sleeve 95 on socket 94 to radially withdraw the locking mechanism in the socket allowing the ball 93 on strut 91 to be removed from the socket. With the ball 93 thus released, the entire rear support frame is removed and can be withdrawn, collapsed and stored.

Figure 2:
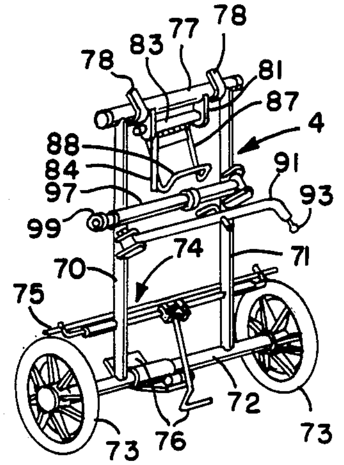
FIG. 2 illustrates the removable rear support frame disconnected from the chair of FIG. 1 showing the tubular strut and brace folded for storage.
Figure 3:
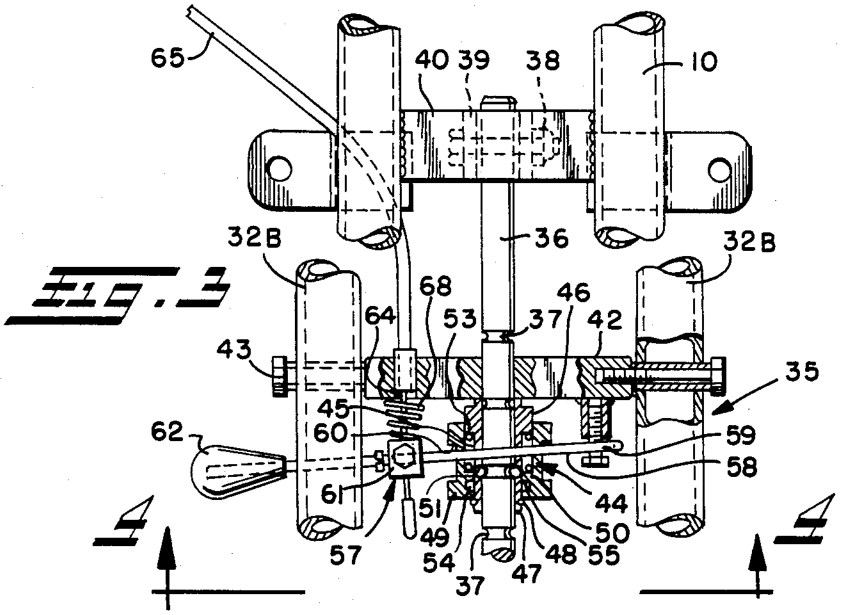
FIG. 3 illustrates a releasable latch mechanism used to vary the inclination of the seat frame relative to the front support frame.

To collapse the rear wheel frame, the sleeve 102 on socket 99 is depressed to radially withdraw the locking means in the socket permitting the ball 97 on strut 91 to be removed from socket 99. This releases reinforcement brace 97 from strut 91. The strut 91 and brace 97 are then free to be moved around their pivot points 92 and 98, respectively, to assume their collapsed positions as shown in FIG. 2. The thus collapsed rear support frame 4 may be stowed in the vehicle trunk, back seat or other location.

The chair and patient can be secured to the vehicle in several ways. First, the seat belt 107 of the automobile can be passed through loops 14 on the seat frame 2 and then buckled behind the chair. The vehicle seat belt 107 thus holds the chair on the seat and precludes the chair from moving away from the seat. With the chair thus secured by the vehicle's seat belt, the patient is secured to the chair by the seat belt on the chair itself and/or by the harness passing through grommets 104 in the seat back 17. If additional or alternative patient restraint is desired, a harness system 109 secured to the floor board of the automobile behind the automobile's seat can be used.

Figure 9:
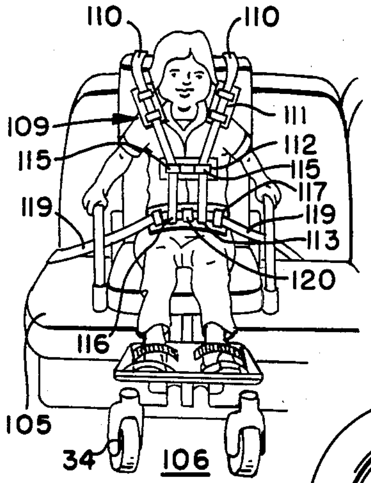
FIG. 9 is a front elevation of the mobile chair and patient positioned in and secured to the automobile.

As shown in FIGS. 8 and 9, such a harness system 109 may include two upper straps 110, which are connected to the automobile floor and extend upwardly over the top of the car seat and chair and then downwardly over the front of the patient. These two straps 110 are provided with two adjustable shoulder cushions 111, an adjustable chest pad 112 and an adjustable lap pad 113. The chest pad has two loops 115 thereon through which the straps 110 respectively extend. The chest pad thus interconnects the upper harness straps and is adjustable therealong in accordance with the needs of the patient. The lap pad 113 has the ends of the two upper straps adjustably secured thereto, with loops 116 being formed in the lower ends of such straps. These bottom adjustable loops permit the straps 110 to be shortened or lengthened as required. The lap pad 113 also has two outer loops 117 to receive the bottom straps 119 on the harness system.

The two bottom straps 119 are respectively secured to the automobile floor behind the automobile seat and extend through or around the automobile seat for positioning over opposite sides of the patient. These bottom straps 119 are respectively fed through guide loops 117 and the upper strap loops 116 and are then joined by a conventional buckle 120. This harness system 109 is easily installed and provides comfortable restraint pads at the patient's shoulders, chest and lap.

To remove the patient from the automobile, the harness system 109 is initially removed by undoing the buckle 120, by removing lower straps 9 from around the patient and by swinging the upper straps 110 and associated cushion pads over the patient's head. The rear support frame 4 is then retrieved, and the brace and strut are returned to their operative positions by connecting the ball and socket joint between brace 97 and strut 91. The rear wheels 73 are then placed on the ground outside the vehicle and are locked in place by actuating braking system 74. Strut 91 on the rear support frame 4 is then secured to the front support frame 3 by inserting and locking ball 93 in socket 94. The car seat belt 107 is then unbuckled and withdrawn from loops 14 on the seat support frame.

The attendant then grasps the handles 6 and/or loops 14 and swings the front support frame and seat frame out of the automobile while the front casters 34 remain on the automobile floor. The cross tube 30 on front support frame is then lowered into the U-shape guides 78 extending upwardly from upper tube 77 on rear support frame 4. The toggle clamp 79 is then activated rigidly to secure the front support frame and seat frame to the rear support frame. This toggle clamp activation is accomplished by swinging the handle and latch upwardly in a clockwise direction as viewed in FIG. 10 so that the hook end 88 thereof engages the upper end of clamping member 89 on front support frame 3. The toggle handle is then swung in a clockwise direction as viewed in FIG. 10 to an overcenter position positively locking the front support frame to the rear support frame.

With the toggle clamp thus secured, brake system 74 is released and the mobile chair 1 is rocked back on its rear wheels to elevate the front casters above the vehicle floor 106. The mobile chair 1 may then be pulled backwardly by the attendant until the front casters and foot rest support assembly clear the vehicle. The chair is then rocked forwardly about its rear wheels until the front casters 34 engage the ground so that the chair is supported by all four wheels.

Figure 11:
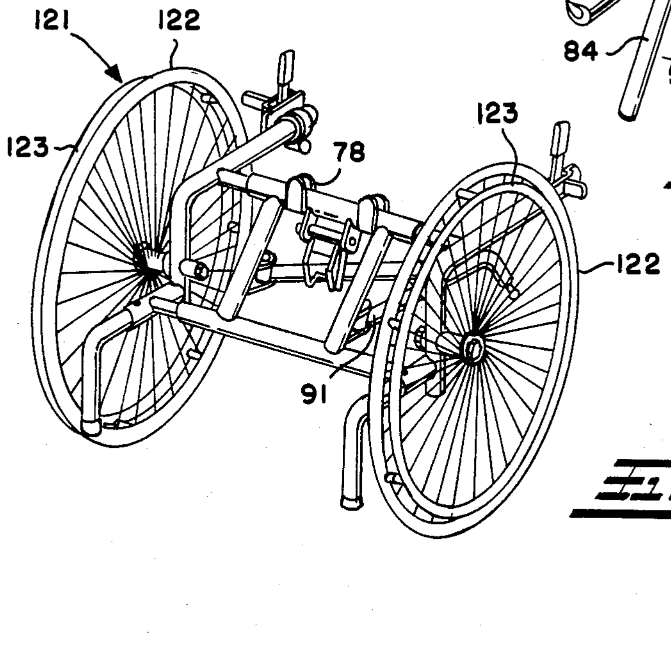
FIG. 11 illustrates a second embodiment for a removable rear support frame having larger diameter wheels than those shown in Fig.
Figure 12:
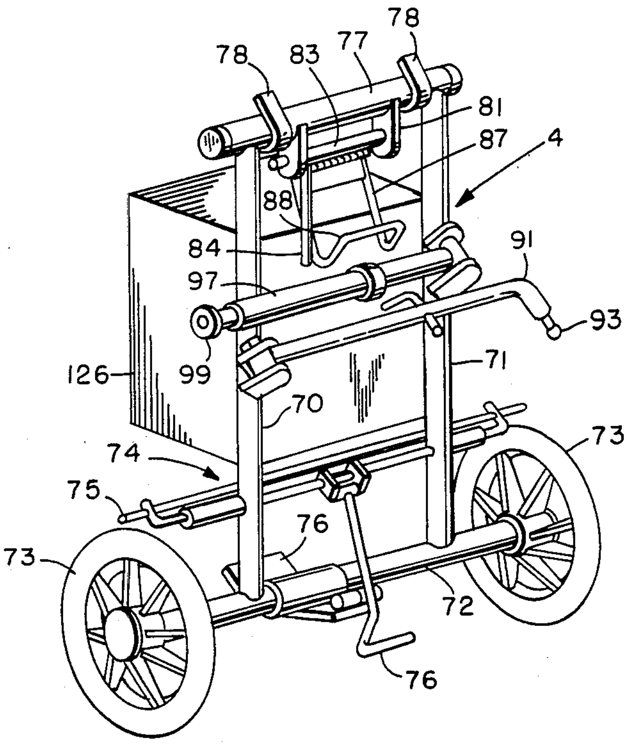
FIG. 12 illustrates a third embodiment of a removable rear support frame having motor driven rear wheels.

As the patient grows, the mobile chair 1 can be readily adapted to the person's needs. For example, alternate rear support frames can be used with the chair. As shown in FIG. 11, a rear support frame 121 with 24 inch wheelchair wheels 122 can be connected to and removed from the front support frame and seat frame. This rear support frame 121 is connected to the front support frame 3 and seat frame 2 in the same manner described above since it too is provided with a releasible and collapsible strut 91 and U-shape guides 78. By using this alternate rear support frame, the patient can push himself by grasping handrails 123 on wheels 122. Similarly, a patient, who has sufficient dexterity and awareness to control a powered chair, can selectively use a removable rear support frame having a motor 126 mounted thereon as illustrated in FIG. 12 to drive the rear wheels in conjunction with the front support frame.

It will be apparent from the foregoing that changes may be made in the details of construction and configuration without departing from the spirit of the invention as defined in the following claims.

What is claimed is:

1. A mobile chair comprising a seat frame, a front support frame including front wheels rotatably mounted thereon for supporting said front support frame, a rear support frame including rear wheels rotatably mounted thereon for supporting said rear support frame, said seat frame being selectively pivotable about a fixed axis with respect to said front support frame to vary the inclination of said seat frame relative to said front support frame, and means for releasably connecting said rear support frame to said front support frame to permit said rear support frame selectively to be removed from and reconnected to said front support frame, said means for releasably connecting including swivel joint means selectively permitting said front support frame to pivot in at least two planes relative to the rear support frame when said swivel joint means is connected.

2. The mobile chair of claim 1 wherein said seat frame includes a seat bottom and a seat back.

3. The mobile chair of claim 1 further including latch means for selectively securing said seat frame to said front support frame to preclude pivotal movement of said seat frame relative to said front support frame.

4. The mobile chair of claim 3 wherein said latch means includes a latch carried by a pivotal mount on said front support frame and a grooved rod pivotally carried by said seat frame.

5. The mobile chair of claim 4 wherein said grooved rod extends through and is normally held by said latch to secure the seat frame to the front support frame.

6. The mobile chair of claim 5, wherein said latch means further includes means selectively to release said grooved rod from said latch to permit said seat frame to be pivoted relative to said front support frame to change the inclination of said seat frame.

7. The mobile chair of claim 1 wherein said swivel joint means includes a ball and socket.

8. The mobile chair of claim 7 wherein said means for releasably connecting said rear support frame to said front support frame further includes a toggle means carried by said rear support means selectively to provide an over center clamp between said rear support means and said front support frame.

9. The mobile chair of claim 8 wherein said rear support frame includes an upstanding tubular framework and brace means pivotally connected at one end to said upstanding support framework.

10. The mobile chair of claim 9 wherein said brace means includes a strut having said ball at its distal end, said strut extending forwadly from said upstanding support framework when said ball is releasably received in the socket, the socket being mounted on the front support frame.

11. The mobile chair of claim 10 wherein said brace means further includes a reinforcement brace extending diagonally forwardly from said upstanding support framework to a releasable connection with said strut adjacent its front.

12. The mobile chair of claim 11 wherein the proximal ends of the strut and reinforcement braces are pivotally connected to the upstanding tubular framework to permit the rear support frame to be collapsed for storage when disconnected from the front support frame.

13. The mobile chair of claim 1 wherein said rear support frame includes motor means for driving said rear wheels.

14. The mobile chair of claim 1 wherein said rear wheels include hand rails for facilitating manual rotation of said rear wheels.

15. A mobile chair comprising a seat frame, a front support frame carrying forward ground engaging means, a rear support frame having rear ground engaging means and means removably connecting said rear support frame to said front support frame to permit said rear support frame to be selectively removed from and reconnected to the front support frame for different chair uses, said seat frame including a seat bottom and a seat back for supporting an individual in a seated position and being mounted on and selectively pivotable with respect to said front support frame from a generally upright position through successively inclined positions, said front support frame having a first portion generally parallel to said seat bottom when said seat frame is in the upright position and a front leg extending downwardly and forwardly to said forward ground engaging means, said first portion being adapted to rest on an automobile seat when said forward ground engaging means rests on the floor of the automobile and said rear support frame has been removed, said means removably connecting including a first release means for releasably connecting said rear support frame with said first portion of said front support frame and second swivel joint release means for releasably connecting said rear support frame with said front leg portion, said second swivel joint release means enabling said front support frame to pivot in at least two planes with respect to said rear support frame when said first release means has been disconnected.

16. The mobile chair of claim 15 wherein said swivel joint is a ball and socket joint.

17. The mobile chair of claim 15 wherein said second release means includes means to swivel said front support frame with respect to said rear support frame after said first release means is released to allow said front support frame to be swung into an automobile and placed on a seat thereof.

18. The mobile chair of claim 15 wherein said seat frame includes a pair of loops extending rearwardly from said seat bottom.

19. The mobile chair of claim 15 further including securing means on said chair for attaching said chair to the automobile seat by using a seat belt of the automobile in cooperation with said securing means, said securing means positioning said seat back forwardly of the back of the automobile seat.

20. The mobile chair of claim 15 further including means for pivoting said seat frame about an axis fixed with respect to said front support frame and latch means for locking said seat frame in any of a plurality of successively inclined positions.

21. The mobile chair of claim 20 wherein said latch means includes first and second operating means, said first operating means being located below said seat bottom and said second operating means being located adjacent the top of said seat back 22. The mobile chair of claim 15 further including means to collapse the rear support frame when the same has been removed from said front support frame.

23. A mobile chair comprising a seat frame, a front support frame including front wheels for supporting said front support frame, a rear support frame including rear wheels for supporting said rear support means, said seat frame being selectively pivotable about a fixed axis with respect to said front support frame to vary the inclination of said seat frame relative to said front support frame, and means for releasably connecting said rear support frame to said front support frame including a first releasable coupling selectively permitting relative pivotal movement in at least two planes between said front support frame and said rear support frame when said first releasable coupling is connected.

24. The mobile chair of claim 23 wherein the means for releasably connecting includes a second releasable coupling between said rear support frame and said front support frame, said second releasable coupling being disconnected to permit relative pivotal movement between said front and rear support frames when said first releasable coupling is connected.

25. The mobile chair of claim 23 wherein the first releasable coupling includes a ball and socket joint and said second releasable coupling includes a toggle clamp.

* * * * *